United States Patent Office 3,849,482
Patented Nov. 19, 1974

3,849,482
AMINE SALTS OF CIS-PROPENYLPHOSPHONIC ACID
Burton G. Christensen, Scotch Plains, N.J., William J. Leanza, Staten Island, N.Y., and Thomas R. Beattie, North Plainfield, N.J., assignors to Merck & Co., Inc., Rahway, N.J.
No Drawing. Application May 15, 1968, Ser. No. 729,420, which is a continuation-in-part of application Ser. No. 679,203, Oct. 30, 1967, both now abandoned. Divided and this application Apr. 19, 1971, Ser. No. 135,396
Int. Cl. C07f 9/38
U.S. Cl. 260—501.21                3 Claims

ABSTRACT OF THE DISCLOSURE

Novel cis-propenylphosphonic acid, and salts and esters thereof, are produced by selective hydrogenation of propynylphosphonic acid, or salts or esters thereof. Cis-propenylphosphonothioates, phosphonoamides and phosphonic dihalides are produced by treatment of the free acid with thionyl halide, and reaction of the phosphoric dihalide with an alcohol, a thiol, or a primary or secondary amine. These cis-propenylphosphonic acid compounds are intermediates in the synthesis of the antibacterially active ($\pm$) (cis-1,2-epoxypropyl)phosphonic acid, and the active ($-$) enantiomer thereof.

---

This application is a division of copending U.S. Application Ser. No. 729,420, filed May 15, 1968, now abandoned, which is a continuation-in-part of copending U.S. Application Ser. No. 679,203, filed Oct. 30, 1967, now abandoned.

This invention relates to novel chemical compounds and to methods of preparing them. More specifically, it relates to novel cis-propenylphosphonic acid, to derivatives thereof, and to processes for making such compounds.

($-$) (Cis-1,2-epoxypropyl)phosphonic acid and its salts have a high degree of antibacterial activity against a large number of pathogens. The ($\pm$) (cis-1,2-epoxypropyl) phosphonic acid and its salts also have substantial antibacterial activity, which on a weight basis is essentially half that of the ($-$) isomer. These compounds are active in inhibiting the growth of both gram-positive and gram-negative pathogen bacteria. They are active against species of Bacillus, Escherichia, Staphylococci, Salmonella and Proteus pathogens, and antibiotic-resistant strains thereof. Illustrative of such pathogens are Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus and Staphylococcus pyogenes. Thus, ($-$) and ($\pm$) (cis-1,2-epoxypropyl)phosphonic acid and salts thereof can be used as antiseptic agents to remove susceptible organisms from pharmaceutical, dental and medical equipment and other areas subject to infection by such organisms, and to inhibit harmful bacterial growth in industrial paints. Similarly, they can be used to separate certain microorganisms from mixtures of microorganisms. They are useful in the treatment of diseases caused by bacterial infections in man and animals and are particularly valuable in this respect, since they are active against many strains of pathogens resistant to previously available antibiotics.

The salts of ($-$) and ($\pm$) (cis-1,2-epoxypropyl)phosphonic acid are useful as preservatives in industrial applications since they effectively inhibit undesirable bacterial growth in the white water used in paper mills, and in paints, e.g. in polyvinyl acetate latex paint.

When ($-$) and ($\pm$) (cis-1,2-epoxypropyl)phosphonic acid or its salts are used for combatting bacteria in man or in lower animals, they may be administered orally in a dosage form such as capsules or tablets, or in a liquid solution or suspension. These formulations may be prepared using diluents, granulating agents, preservatives, binders, flavoring agents and coating agents known to those skilled in this particular art.

The ($-$) (cis - 1,2-epoxypropyl)phosphonic acid referred to herein rotates plane-polarized light in a counter-clockwise direction (to the left as viewed by the observer) when the rotation of its disodium salt is measured in water (5% concentration) at 405 m$\mu$.

The designation cis used in describing the 1,2-epoxypropylphosphonic acid compounds means that each of the hydrogen atoms attached to carbon atoms 1 and 2 of the propylphosphonic acid are on the same side of the oxide ring. The term "cis" is clear in referring to the cis-propenylphosphonic acid compounds of the present invention.

One object of this invention is to provide novel intermediates useful in synthesizing ($\pm$) (cis-1,2-epoxypropyl)phosphonic acid compounds. Another object is provision of methods of preparing these novel intermediates. Other objects will become clear from the following discussion of the invention.

The cis-propenylphosphonic acid compounds of this invention may be represented by the formula

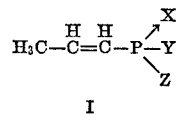

I where X represents oxygen or sulfur; Y represents —OR, —SR, halo or —NR$_1$R$_2$; Z represents —OR, —SR, halo or NR$_1$R$_2$; R represents hydrogen or a hydrocarbyl radical; R$_1$ and R$_2$ represent hydrogen or a hydrocarbyl radical or an acyl radical. Also included within Formula I, and representing preferred species of the invention, are the organic and inorganic salts of those compounds where R represents hydrogen. The substituents Y and Z may be the same or different in any specific compound.

The structural formulas of the novel compounds of this invention are for convenience shown in the planar formula above because the configuration is adequately defined by the name cis-propenylphosphonic acid. However, for the sake of completeness, the spatial configuration may be represented structurally as

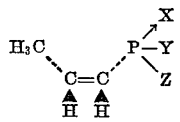

This spatial configuration is a critical aspect of this invention because earlier-reported propenylphosphonic acid compounds are in the trans-configuration, or are mixtures of cis and trans isomers, whereas the present invention affords compounds in the cis-form substantially free of trans.

When R, R$_1$ and/or R$_2$ in Formula I represent a hydrocarbyl radical, such radical may be an aliphatic, cycloaliphatic, acyl, aralphatic, aromatic or heterocyclic radical which may, if desired, be further substituted. Thus, for example, it may be aliphatic such as substituted or unsubstituted alkyl, alkenyl or alkynyl, representative examples of which are alkyl such as methyl, propyl, isopropyl, t-butyl, hexyl, octyl, decyl, dodecyl, haloalkyl such as chloroethyl, fluoropropyl, bromoethyl and dichloroethyl, acyloxyalkyl such as acetoxymethyl, propionoxyethyl, and benzoyloxyethyl, hydroxypropyl, aminomethyl, aminoethyl, alkylaminoalkyl such as dimethylaminomethyl or diethylaminopropyl, p-nitrobenzoylaminomethyl, carboalkoxymethyl, cyanoethyl, sulfonamidoethyl, phthalimidomethyl and methoxymethyl; alkenyl such as allyl, methallyl, vinyl, propenyl, hexenyl, octadienyl; alkynyl such as propargyl, ethynyl or chlorethynyl; cycloalkyl such as cyclohexyl, cyclohexenyl or cyclopropyl. When R, R₁ or R₂ are aliphatic, they preferably have from 1-6 carbon atoms, i.e. substituted or unsubstituted lower alkyl or alkenyl.

Examples of R, R₁ and/or R₂ representing an araliphatic radical are aralkyl such as benzyl, phenethyl, phenylpropyl, p-halobenzyl and o-, m- or p-alkoxybenzyl, nitrobenzyl, aminophenethyl, pyridylethyl, furylmethyl, thienylpropyl and the like.

R, R₁ and/or R₂ may also represent an aryl radical such as phenyl, naphthyl or substituted phenyl or naphthyl, e.g. p-chlorophenyl, o-nitrophenyl, o,p-dihalophenyl, cyanophenyl, methoxyphenyl, aminophenyl and tolyl. The aryl radical is preferably a mononuclear aromatic residue. When R, R₁ and/or R₂ are heterocyclic, they may be heteroaromatic such as pyridyl, furyl, thienyl, thiazolyl or pyrazinyl, or alternatively may represent a hydrogenated hetero ring, examples of which are tetrahydrofuryl and piperazinyl.

When both Y and Z are —OR or —SR, they may be joined together to afford a cyclic ester of the type

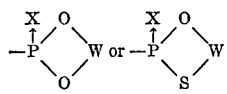

where W may be derived from a compound having two hydroxyl or two thio groups. Examples of W are

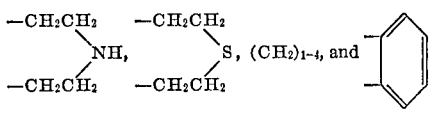

Those compounds of Formula I which are acidic, i.e. the free acids and the mono-esters, may form salts, and such salts constitute an especially preferred aspect of the invention because they are highly useful in making (±) (cis-1,2-epoxypropyl)phosphonic acid compounds.

As will be appreciated by those skilled in this art, the free phosphonic acid compounds will form both organic and inorganic salts, and both are contemplated by this invention. Examples of such salts are inorganic metallic salts such as the sodium, aluminum, potassium, ammonium, calcium, magnesium, silver and iron salts. Organic salts that may be mentioned as representative include the salts with primary, secondary or tertiary amines such as monoalkylamines, dialkylamines, trialkylamines and nitrogen containing heterocyclic amines. Representative examples are salts with amines such as α-phenethylamine, diethylamine, diethylene triamine, quinine, brucine, lysine, protamine, arginine, procaine, ethanolamnie, morphine, benzylamine, ethylenediamine, N,N'-dibenzylethylenediamine, diethanolamine, piperazine, N-aminoethylpiperazine, dimethylaminoethanol, 2-amino-2-methyl - 1 - propanol, theophylline, esters of amino acids, and N-methylglucamine. Both mono- and di-basic salts may be prepared when the cation is monovalent R₁ and/or R₂ in Formula I also represent an acyl radical, and preferably lower alkanoyl such as acetyl, propionyl, butyryl and the like, or monocyclic aroyl such as benzoyl, halobenzoyl, p-nitrobenzoyl, furoyl or thienoyl. R₁ and R₂ may also be joined together to form a cyclic ring with the nitrogen of —NR₁R₂ being part of the ring, e.g. as in morpholinyl, thiamorpholinyl or piperidyl.

When Y and/or Z in Formula I are halo, it is preferred that the halogen be chloro, bomo or fluoro.

In accordance with the process aspects of this invention, the cis-propenylphosphonic acid and salts and esters thereof may be synthesized by the selective hydrogenation of a cis-propenylphosphonic acid, as shown structurally below:

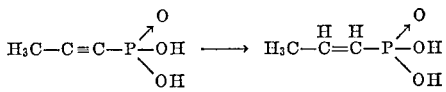

Although illustrated on the free acid, the process is equally applicable to salts, alkyl and aryl esters. It may also be used for unsaturated esters such as the alkenyl or alkynyl esters, and aralkyl esters, although these may be reduced or hydrogenolyzed at least in part during the reaction.

The step of selectively reducing the propynyl acid, salt or ester to produce the propenylphosphonic acid or the corresponding salt or ester is conveniently effected by hydrogenating the propynyl compound in the presence of a suitable hydrogenation catalyst such as a noble metal or Raney nickel catalyst. In carrying out the hydrogenation to obtain maximum yields of the desired propenyl compound, the hydrogenation is stopped when one mole of hydrogen per mole of the starting propynyl compound has been taken up in order to avoid complete saturation of the unsaturated bond. Catalysts especially useful in this reduction are 5% palladium on calcium carbonate or Raney nickel. These catalysts containing a small amount of added poisoning agents to reduce their activity can also be used in carrying out the selective hydrogenation. Thus, the 5% palladium on calcium carbonate can be poisoned by the addition of a small amount of lead acetate and the Raney nickel can be poisoned by the addition of a small amount of zinc acetate and/or an organic base such as piperidine, morpholine, quinoline and the like. These poisoned catalysts are especially useful in the reduction of pure propynylphosphonic acids. The specific catalyst and the amount required for the hydrogenation will depend in part upon the purity of the propynyl compound being reduced, but generally, an amount of catalyst between about 1 and 5% is sufficient in carrying out this selective reduction.

As solvent there are conveniently employed lower alkanols such as methanol, ethanol or isopropanol, although the solvent is not critical. Positive hydrogen pressures of from about 20–100 p.s.i.g. are preferred but again higher or lower pressures may be employed without adverse effect.

Representative examples of cis-propenylphosphonic acid compounds prepared by selective catalytic hydrogenation of the corresponding propynylphosphonic acid compound are the lower alkyl esters such as methyl, ethyl, propyl, t-butyl, isopropyl and hexyl; and the aryl esters such as phenyl, naphthyl, tolyl, p-halophenyl, and hydroxyphenyl, pyridyl and the like; alkali and alkaline earth metal salts such as the sodium potassium, calcium and magnesium salts; such as the sodium potassium, calcium and magnesium salts; and amine salts examples of which are benzylamine, phenethylamine, ammonium, ethylenediamine, piperazine, quinine and like salts.

The cis-propenylphosphonic dihalides (Formula I, where Y and Z are halo) are prepared by treating cis-propenylphosphonic acid with 2 moles of a halogenating agent such as a thionyl halide, e.g. thionyl chloride, bromide or fluoride, phosphorus pentachloride, phosphonyl fluorobromide and the like. This process is carried out by contacting the reactants in a suitable organic solvent such as benzene, toluene, xylene, pentane, ether, methylene chloride and the like. The time and temperature of the reaction are not critical, and good results are obtained at temperatures of from about −10° C. to the reflux temperature of the solvent.

The compounds of this invention where Y and/or Z are O-hydrocarbyl and/or S-hydrocarbyl are obtained by reacting the cis-propenylphosphonic dihalide, and preferably the dichloride or dibromide, with an appropriate alcohol or thiol in the presence of a tertiary base such as triethylamine, dimethylaniline, pyridine or collidine. An alkyl, aryl, aralkyl, alkenyl or alkynyl alcohol or thiol is employed to obtain the corresponding phosphonate or phosphonothioate. Use of 2 moles of alcohol or thiol affords the diphosphonate or di-phosphonodithioate, whereas 1 mole yields the mono-ester.

The reaction is usually conducted at atmospheric pressure and at a temperature of from −10° C. to the boiling point of the reaction solvent. In the absence of a tertiary base, more vigorous reaction conditions are employed, e.g. temperature of about 100° C. for several hours followed by removal of the hydrohalic acid.

As solvent, any inert organic solvent such as ethyl ether, benzene, toluene, ethyl acetate, methylene chloride and the like may be used. Examples of compounds of the invention obtained in this manner are dimethyl cis-propenyl phosphonate, dibenzyl cis-propenylphosphonate, diallyl cis-propenylphosphonate, diphenyl cis-propenylphosphonate, di-t-butyl cis-propenylphosphonate, dimethallyl cis-propenylphosphonodithioate, di-tolyl cis-propenylphosphonodithioate, diethyl cis-propenyl phosphonodithioate, dihexyl cis-propenylphosphonodithioate, ethyl cis-propenylphosphonochloridate, benzyl cis-propenylphosphonofluoridate, amyl cis-propenylphosphonobromidate, allyl cis-propenylphosphonochloridothioate, p-chlorophenyl cis - propenylphosphonochloridothioate, and β-methoxymethyl cis-propenylphosphonochloridate.

The phosphonohalidates and phosponohalidothioates are readily converted to the corresponding cis-propenylphosphonate and cis-propenylphosphonothioate monoesters by heating the halidates in aqueous solution at a pH of from about 4.5–8.0 for a short period of time. When the halide is fluoride, removal of the fluorine is accelerated by the presence of hydroxylamine.

In accordance with still another aspect of the invention, the cis-propenylphosphonamides and phosphonodiamides of Formula I above (Y and/or Z are —NR₁R₂) are prepared by reacting the cis-propenylphosphonic dihalide with ammonia or a primary or secondary amine in the presence of a tertiary base which acts as a hydrogen chloride acceptor. Thus, the substituted cis-propenylphosphonohalidic amides (Formula I, Y=halo; Z=—NR₁R₂) are prepared by treating cis-propenylphosphonic dihalide with 1 mole of ammonia or a primary or secondary amine. Illustrative amines which are utilized include aliphatic amines such as methylamine and diethylamine, hydrazine and substituted hydrazine, hydroxylamine and substituted hydroxylamine, heterocyclic amines such as morpholine and pyrrolidine, aromatic amines such as aniline and substituted anilines, e.g. N-methylaniline, heteroaromatic amines such as imidazole or pyrrol, guanidine and substituted guanidine, aralkyl amines such as benzylamine and the like. Although the use of a tertiary base as a hydrogen chloride acceptor is preferred, the inclusion of 2 moles of ammonia or of the primary or seconday amine eliminates the need for a tertiary base to scavenge hydrogen chloride.

Although solvents are not necessary for the reaction, they are preferred. Illustrative solvents which may be used include ether, dioxane, tetrahydrofuran, hexane, benzene, toluene, methylene chloride and the like.

Temperatures for the reaction may range from about −10° C. to the boiling point of the solvent, with the lower temperatures, e.g. about 0° C., being preferred. Alternatively, the reaction may be initially run at a temperature of about 0° C. for 1 hour and then completed at elevated temperatures of up to about 85–90° C.

The O-substituted - N - substituted cis-propenylphosphonamides (Formula I, Y=OR; Z=—NR₁R₂) are prepared from the phosphonohalidic amides by treating the latter compounds with an appropriate alcohol, preferably in the presence of a tertiary base. The alcoholysis is carried out at atmospheric pressure and, preferably at a temperature of about 25–50° C. The temperature is not critical, however, and a temperature within the range of from about −10° C. to the boiling point of the solvent is practical. Alternatively, these compounds may be obtained by reaction of ammonia or a primary or secondary amine with an O-substituted cis-propenylphosphonhalidate to obtain the O-substituted-N-substituted cis-propenylphosphonamidate.

When a thiol is employed in the processes described immediately above, using the same reaction conditions, the cis-propenylphosphonoamidothioates of this invention are obtained.

Illustrative of compounds of this invention where Y in formula I is O-hydrocarbyl or S-hydrocarbyl and Z is —NR₁R₂ are:

N,N-diethyl-O-methyl cis-propenylphosphonamidate,
N,N-dibenzyl-O-benzyl cis-propenylphosphonamidate,
N,N-diphenyl-S-methyl cis-propenylphosphonamidothioate,
and N,N-diethyl-S-allyl cis-propenylphosphonamidothioate.

The N,N,N′,N′-tetrasubstituted cis-propenylphosphonodiamides of this invention are prepared from cis-propenylphosphonic dihalide by reaction of a molar quantity of the latter compound with two moles of an amine. The amine utilized may be ammonia or a primary amine or a secondary amine. Utilization of excess amine in order to scavenge liberated hydrogen halide eliminates the necessity for the use of a tertiary base in the reaction. However, if desired, an excess of a tertiary base may be used together with the appropriate molar concentration of amine reactant. It will be understood that 2 moles of amine are required for reaction with the phosphonic dihalide, and in addition a base to neutralize the hydrohalic acid formed in the reaction.

The reaction may be run at temperatures of from about −10° C. to about 100° C. in a suitably inert organic solvent. When the amine utilized is a primary amine, lower temperatures are preferred. With secondary amines, however, it is often necessary to heat to complete the reaction.

The compounds of the invention wherein X in Formula I above is sulfur are obtained by reactions similar to those discussed above, and using cis-propenylphosphonothioic dihalide as starting material. This latter compound is conveniently obtained by reacting cis-propenylphosphonic dihalide with phosphorus pentasulfide.

In addition to the methods discussed immediately above for making the cis-propenylphosphonic halides and phosphonoamides and thioates, these substances may also be obtained by the selective catalytic hydrogenation of the corresponding propynylphosphonic halide, phosphonoamide, and phosphonothioate. Thus, although the catalytic hydrogenation of the propynylphosphonate to the cis-propenylphosphonate has been described hereinabove with respect to the compounds wherein X of Formula I is oxygen and Y and Z are —OR, the process is also applicable to the synthesis of the Formula I compounds wherein at least one of X, Y and Z is not an oxygen containing radical. The starting propynyl compounds are obtained as discussed above by the reaction of a metal acetylene Grignard reagent such as metal acetylene magnesium bromide with the appropriate chlorophosphonamide, chlorophosphonothioate or chlorophosphonic halide. The resulting cis-propenylphosphonothioates, phosphonoamides or phosphonic halides may be epoxidized directly to the corresponding (±) (cis-1,2-epoxypropyl)phosphonic acid compound, or they may be hydrolyzed, preferably with mineral acid, prior to epoxidation.

The following examples are given for the purpose of illustration and not by way of limitation.

EXAMPLE 1

Di-n-butyl propynylphosphonate (10 grams, 0.043 mole) is dissolved in 50 ml. of methanol and hydrogenated in the presence of 3 g. of 5% palladium on calcium carbonate poisoned with lead acetate at 40 p.s.i. in a Parr apparatus. After the uptake of 67.5 p.s.i.g. of hydrogen (theoretical 71 p.s.i.g.) is observed, the reaction mixture is filtered to remove the catalyst and the catalyst washed with methanol. The filtrate is concentrated under reduced pressure to obtain di-n-butyl cis-propenylphosphonate in the form of a pale yellow residue. The residue is distilled under reduced pressure and the di-n-butyl cis-propenylphosphonate (8.49 g.) boiling at 72° C. at 0.12 mm. is collected. The product analyzes for $C_{11}H_{23}O_3P$. The infrared spectrum of the product shows the absence of an acetylene band at 4.5μ and the presence of an olefinic band at 6.12μ, characteristic of the cis-olefin. The NMR spectrum also shows that the product is in the cis configuration.

The di-n-butyl propynylphosphonate used in this example is prepared by adding a solution of methylacetylenemagnesium bromide (0.5 mole) dissolved in a mixture of 2 liters of benzene and 300 ml. of tetrahydrofuran dropwise with stirring to a solution of 96.1 g. (0.5 mole) of di-n-butylchlorophosphonate in 1 liter of benzene. The methylacetylene Grignard reagent is added during 3 hours and the reaction mixture is stirred vigorously during the addition while keeping the temperature below about 28° C. After the addition is complete, the clear solution is allowed to stand at room temperature for about 16 hours. 1 Liter of an aqueous ammonium chloride solution is added to the reaction mixture and the water layer is separated and extracted twice with benzene. The benzene extracts are combined with the benzene layer and the solvent is evaporated under reduced pressure to yield di-n-butyl propynylphosphonate in the form of an oil weighing 61.5 g. The oil is distilled under reduced pressure, yielding an early fraction with a boiling point of 111° C. at 0.5 mm. and a clear yellow liquid main fraction consisting of di-n-butyl propynylphosphonate weighing 47.3 g. and boiling at 102° C. at .15 mm.

When this procedure is repeated using the dimethyl di-t-butyl, diphenyl or di-p-tolyl esters of propynylphosphonic acid (obtained from the appropriate chlorophosphonate and the methylacetylene Grignard), the corresponding esters of cis-propenylphosphonic acid are obtained.

EXAMPLE 2

To a solution of 9 grams (0.044 mole) of di-isopropyl propynylphosphonate in 50 ml. of methanol is added 1.5 g. of 5% palladium on calcium carbonate poisoned with lead acetate and hydrogen is passed through the solution at 40 p.s.i. After the uptake of 71.5 p.s.i.g. of hydrogen (theory, 71.7 p.s.i.g.), the addition of hydrogen is stopped and the reaction mixture is filtered free of catalyst and the catalyst is washed with methanol. Concentration of the filtrate under reduced pressure affords 8.84 g. of di-isopropyl cis-propenylphosphonate. This material distills at 42–43° C. at 0.15 mm.

The di-isopropyl propynylphosphonate used in this example is prepared in accordance with the procedure described in Example 1 by reacting di-isopropylchlorophosphonate with methylacetylenemagnesium bromide. The product is obtained in the form of an oil having a boiling point of 82–84° C. at .4–.45 mm.

EXAMPLE 3

Di-n-butyl cis-propenylphosphonate (9.7 grams) is refluxed in 80 ml. of concentrated hydrochloric acid (12.4 N) for 15 hours in an oil bath maintained at 108–117° C. The reaction mixture is allowed to cool to room temperature, after which the solution is concentrated in vacuo with heating. Water (50 ml.) is added to the residue, and the evaporation process is repeated yielding 6.19 g. of a brown viscous residue. The residue is dissolved in 25 ml. of ethyl ether, and the ether solution is extracted with 3× 10 ml. of water. Evaporation of the ether layer yields 2.56 g. of a brown residue. Evaporation of the aqueous extracts in vacuo yields 3.43 g. of a pale yellow viscous oil. The residue obtained from the aqueous extract is purified by dissolving it in 25 ml. of ether, and extracting the ether solution with 12 ml. of water. Evaporation of the aqueous extract in vacuo with heating yields cis-propenylphosphonic acid, a pale yellow viscous oil. Infrared spectra of the yellow oil shows the characteristic olefinic band at 6.1μ.

EXAMPLE 4

Di-n-butyl propynylphosphonate (500 g., 2.15 moles) is dissolved in 2.5 liters of methanol in a hydrogenation flask. To this is added 50 g. of 5% palladium on calcium carbonate. The flask is filled first with nitrogen and then with hydrogen by alternate evacuation and pressuring. The hydrogen pressure is brought up to 50 p.s.i.g. During 80 minutes shaking, the temperature rises from 25° C. to 45° C. and 1.94 moles of hydrogen is absorbed. Agitation is stopped, the reactor vented and purged with nitrogen. The catalyst is removed by filtration, washed with 200 ml. of methanol and the methanol evaporated in vacuo until the temperature of the residue reaches 100° C. The residue is di-n-butyl cis-propenylphosphonate.

EXAMPLE 5

Salts of cis-propenylphosphonic acid are made by treating the free acid in ethanol with base. The metal salts are obtained by employing a metal oxide or hydroxide as the base, and amine salts by employing the appropriate amine. In order to obtain a mono-salt, the pH is adjusted with the base to 4.8 for metal salts and 4.2 for amine salts; for di-salts the pH is adjusted to 8.8 for metal salts and 8.2 for amine salts. In order to recover the salt, the ethanol is removed by evaporation in vacuo. Thus, for example, 2 g. of cis-propenylphosphonic acid in 50 ml. of ethanol is adjusted to a pH of 4.8 with aqueous sodium hydroxide. The mixture is concentrated to dryness in vacuo to afford mono-sodium cis-propenylphosphonate. When aqueous sodium hydroxide is added to the above solution to a pH of 8.8, and the mixture concentrated to dryness, di-sodium cis-propenylphosphonate is obtained. The mono- and di-benzylamine salts are obtained in the same fashion by adding benzylamine to the ethanolic solution of cis-propenylphosphonic acid to a pH of 4.2 or 8.2. Any of the other salts discussed hereinabove are obtained in the same manner using the appropriate base.

EXAMPLE 6

Into a 250 ml. three-necked round-bottomed flask there is added 6.1 g. of cis-propenylphosphonic acid, 60 ml. of dry benzene and 9.0 ml. of pyridine. The mixture is heated to 50° C., the heat removed and 13.2 g. of thionyl chloride added dropwise at such a rate as to keep the reaction mixture at 50° C. The mixture is then cooled to room temperature and stirred for 2 hours at room temperature. The mixture is filtered and the filtrate concentrated in vacuum at 35° C. to yield 4.5 g. of a turbid oil. It is distilled to afford cis-propenylphosphonic dichloride, b.p. 67–69° C./10 mm.; $n_D^{20}$: 1.4885.

EXAMPLE 7

A stirred mixture of propenylphosphonic dichloride (0.1 mole) and triethylamine (0.2 mole) in 100 ml. of benzene is cooled to 5° C. To the mixture there is added benzyl alcohol (0.1 mole) at such a rate as to maintain the temperature at 5–10° C. When the addition is complete, the mixture is stirred at room temperature for 1 hour. The precipitated triethylamine hydrochloride salt is filtered off and the solvent is removed at reduced pressure to leave a residue of benzyl cis-propenylphosphonochloridate. Aqueous 1N sodium hydroxide is added and the mixture stirred, during which time a clear solution forms. The solution is then acidified and extracted with n-butanol. Removal of the solvent affords sodium benzyl cis-propenylphosphonate.

When this procedure is repeated using allyl alcohol, propargyl or phenol in place of benzyl alcohol, the allyl, propargyl and phenyl esters are produced.

EXAMPLE 8

A stirred mixture of 0.1 mole of cis-propenylphosphonic dichloride and 0.1 mole of triethylamine in 100 ml. of benzene is cooled to 5° C. To the mixture there is added 0.2 mole of benzyl mercaptan at such a rate as to maintain the temperature at 5–10° C. When the addition is complete, the mixture is stirred at room temperature for one hour. The precipitated triethylamine hydrochloride salt is then filtered off and the solvent is removed at reduced pressure to leave dibenzyl cis-propenylphosphondithioate. The thioate is obtained when cis-propenylphosphonothioic dichloride is the starting material.

When ethyl mercaptan or t-butylthiol are used in this experiment in place of benzyl mercaptan, there is obtained diethyl and di-t-butyl cis-propenylphosphonodithioate.

EXAMPLE 9

A stirred solution of cis-propenylphosphonic dichloride (0.1 mole) in 200 ml. of absolute ether is cooled to 0° C. and then treated dropwise with a solution of absolute ethanol (0.1 mole) and triethylamine (0.1 mole) in 50 ml. of anhydrous ether. The addition rate is controlled so as to maintain the reaction temperature between 0–5° C. When the addition is complete, the reaction mixture is stirred in the cold for one hour. The precipitate is triethylamine hydrochloride is then removed by filtration and the filtrate concentrated under reduced pressure to yield O-ethyl cis-propenylphosphonochloridate.

EXAMPLE 10

0.01 Mole of cis-propenylphosphonic dichloride and 0.15 mole of phosphorus pentasulfide in 100 ml. of dry xylene is refluxed for 5 hours. The solid is then filtered off and the filtrate washed with two 50 ml. portions of water and dried over sodium sulfate. The solvent is distilled and then the residue is distilled at reduced pressure to yield cis-propenylphosphonothioic dichloride.

EXAMPLE 11

0.2 Moles of cis-propenylphosphonic dichloride in 200 ml. of ether is cooled to —13° C. and to this solution with stirring is added dropwise a mixture of 0.4 moles of pyridine and 0.4 moles of β-hydroxypropionitrile with stirring. The temperature is held below —10° C. The mixture is then poured onto 1 liter of water and 500 grams of ice. The aqueous layer is separated from the ether and extracted with 3× 100 ml. portions of ether. The combined ether filtrate and extracts are washed with water, with dilute hydrochloric acid and finally again with water. After drying the ether solution over anhydrous sodium sulfate, it is filtered and concentrated to dryness in vacuo to give bis(2-cyanoethyl) cis-propenylphosphonate.

In the same manner there is prepared bis(2,2,2-trichloroethyl) cis-propenylphosphonate by utilizing 0.4 moles of trichloroethanol in 100 ml. of ether in the above example.

EXAMPLE 12

To a solution of 0.1 mole of cis-propenylphosphonic dichloride in 50 ml. of benzene is added 0.2 mole of collidine. While cooling at 5° C. a solution of 0.1 mole of phenol in 50 ml. of benzene is added. The mixture is stirred at 5–10° C. for one hour. A solution of 0.1 mole of isopropanol in 50 ml. of benzene is then added. After another hour, the salts are filtered and the filtrate concentrated to dryness to afford isopropylphenyl cis-propenylphosphonate.

EXAMPLE 13

A solution of 0.1 mole of cis-propenylphosphonic acid in dry ethyl acetate is treated with 0.2 mole of triethylamine followed by 0.2 mole of N-chloromethylphthalimide. The stirred mixture is held at 40° C. overnight and then refluxed for 30 minutes. The mixture is filtered and the filtrate concentrated to dryness to afford bis-phthalimidomethyl cis-propenylphosphonate.

EXAMPLE 14

To a stirred solution of cis-propenylphosphonic dichloride (0.1 mole) in dry benzene (200 ml.) cooled to 5° C. is added dropwise a solution of ammonia (0.2 mole) and triethylamine (0.1 mole) in dry benzene (100 ml.). The addition rate is controlled so as to maintain the reaction temperature between 5–10° C. When the addition is complete, the reaction mixture is stirred at 5–10° C. for one hour, refluxed for several hours and filtered while hot to remove the triethylamine hydrochloride salt. Concentration of the benzene filtrate to dryness affords cis-propenylphosphonodiamide.

When the above procedure is repeated using 0.2 moles of N,N-diethylamine, there is obtained N,N,N',N'-tetraethyl cis-propenylphosphonodiamide.

EXAMPLE 15

A solution of 0.01 mole of cis-propenylphosphonothioic dichloride in 20 ml. of benzene is added to a solution of 0.02 mole of methanol and 0.02 mole of triethylamine in 50 ml. of benzene. The mixture is refluxed for 8 hours, filtered and the filtrate concentrated in vacuo to yield O,O-dimethyl cis-propenylphosphonothioate.

In the same manner as described above, and using 0.01 mole of methanol, there is obtained O-methyl cis-propenylphosphonochloridothioate.

EXAMPLE 16

A. To a stirred solution of cis-propenylphosphonic dichloride (0.1 mole) in dry ether (200 ml.) cooled to 0° C. is added dropwise a solution of diethylamine (0.1 mole) and triethylamine (0.1 mole) in dry ether. The addition rate is controlled so as to maintain the reaction temperature between 0–5° C. When the addition is complete, the reaction mixture is stirred in the cold for one hour more, and then the triethylamine hydrochloride filtered off. Removal of the solvent from the filtrate under reduced pressure affords N,N-diethyl cis-propenylphosphonochloridic amide.

B. A stirred solution of t-butanol (0.1 mole) and triethylamine (0.1 mole) in 100 ml. of anhydrous ether is treated with a solution of N,N-diethyl cis-propenylphosphonochloridic amide (0.1 mole) in anhydrous ether. The mixture is refluxed for one hour, then the precipitated triethylamine hydrochloride is filtered off. Concentration of the filtrate under reduced pressure affords O-t-butyl-N,N-diethyl cis-propenylphosphonamidate.

The diamides are obtained from the cis-propenylphosphonic dichloride according to the above procedures by utilizing 2 moles of primary or secondary amine.

EXAMPLE 17

Phosphorus trichloride (68.7 grams, 0.5 mole) and 750 ml. of anhydrous benzene are placed in a 2-liter, 3-necked flask equipped with mechanical stirrer, thermometer, dropping funnel and a drying tube. The solution is cooled to 5° C. and triethylamine (50.6 grams, 0.5 mole) is added at 5°–10° C. during 20 minutes. The benzene solution is then stirred for 20 minutes. A solution of triethylamine (50.6 grams, 0.5 mole) and t-butanol (37.06 grams, 0.5 mole) is added with stirring during 20 minutes at 5°–10° C., and the mixture is stirred for 20 minutes. A second portion of t-butanol (37.06 grams, 0.5 mole) is then added at 5°–10° C. over a 20 minute period, and the reaction mixture containing di-t-butyl phosphorochloridite is stirred for 90 minutes at 5°–10° C.

Triethylamine (50.6 grams, 0.5 mole) and propargyl alcohol (28.03 grams, 0.5 mole) are dissolved in 40 ml. of anhydrous benzene, and the solution is added to the reaction mixture containing di-t-butylphosphorochloridite with stirring during 25 minutes, maintaining the reaction temperature between 5°–10° C. by external cooling. The resulting mixture containing di-t-butyl-2-propynylphosphite is stirred at 5°–10° C. for one hour.

The reaction mixture containing di-t-butyl-2-propynylphosphite is then heated to reflux, and the refluxing is continued for one hour. The solution is then cooled to room temperature with a water bath, and 185 ml. of water is added in portions. The triethylamine hydrochloride dissolves in the aqueous layer, and the organic layer is separated from the aqueous layer. The benzene solution is heated at atmospheric pressure, and the water is removed by azeotropic distillation. The residual benzene solution containins di-t-butylpropadienylphosphonate.

Where desired, the crude ester can be obtained by removing the solvent and distilling the ester under high vacuum; th pure ester is characterized by IR and NMR spectra.

The dried benzene solution of di-t-butyl-propadienylphosphonate is hydrogenated at 20°–25° C. with 5% palladium-on-carbon catalyst (5.0 grams) until hydrogen absorption ceases. The catalyst is removed by filtration and is washed with 2× 50 ml. of benzene. Upon removal of the solvent *in vacuo*, di-t-butyl-*cis*-propenylphosphonate is obtained and is characterized by NMR and IR spectra. The crude ester can be purified by high vacuum distillation.

Di-t-butyl-*cis*-propenylphosphonate (1.0 mole) and p-toluene sulfonic acid (0.005 mole) are dissolved in 235 ml. of benzene, and the solution is heated at reflux until the calculated amount of isobutene is formed. A gas metering device is employed to detect the isobutene. The reaction mixture is then cooled to room temperature, the solvent is removed *in vacuo* and *cis*-propenylphosphonic acid is obtained as the residue.

EXAMPLE 18

A stirred mixture of 0.1 mole of *cis*-propenylphosphonic dichloride and 0.2 mole of triethylamine in 100 ml. of benzene is cooled to 5° C. To the mixture there is added 0.2 mole of methyl alcohol at such a rate as to maintain the temperature at 5–10° C. When the addition is complete, the mixture is stirred at room temperature for 1 hour. The precipitated triethylamine hydrochloride salt is then filtered off and the solvent is removed at reduced pressure to leave dimethyl *cis*-propenylphosphonate. Other di-OR-esters of *cis*-propenylphosphonic acid where R is alkyl, alkenyl, alkynyl, aralkyl or aryl, substituted alkyl, aryl or alkenyl are prepared in the same manner using 0.2 mole of the alcohol R—OH.

EXAMPLE 19

A stirred mixture of *cis*-propenylphosphonic dichloride (0.1 mole) and triethylamine (0.2 mole) in 100 ml. of benzene is cooled to 5° C. To the mixture there is added benzyl alcohol (0.1 mole) at such a rate as to maintain the temperature at 5–10° C. When the addition is complete, the mixture is stirred at room temperature for 1 hour. Then the precipitated triethylamine hydrochloride salts are filtered off and the solvent is removed at reduced pressure to leave the monochloro-monobenzyl ester. Aqueous 1 N sodium hydroxide is added and the mixture stirred, during which time a clear solution forms. The solution is then acidified and extracted with *n*-butanol. Removal of the solvent leaves monobenzyl *cis*-propenylphosphonate.

EXAMPLE 20

Bis-(*cis*-propenyl)pyrophosphonic acid 12.2 g. of *cis*-propenylphosphonic acid is heated gradually to 200° C. under a nitrogen atmosphere at 200 mm. Hg pressure, and maintained at this temperature for 48 hours. The heating is discontinued. The resulting product is bis-(*cis*-propenyl)pyrophosphonic acid.

*Cis*-propenylphosphonic acid cyclic dianhydride

Exactly one mole of water is added slowly with vigorous stirring to one mole of *cis*-propenylphosphonic dichloride, keeping the temperature below 10° C. by external cooling. When the evolution of heat stops, the mixture is heated to 120° C. and under 50 mm. pressure until no more gas is evolved to afford *cis*-propenylphosphonic acid cyclic dianhydride.

*Cis*-propenylisohypophosphoric acid 0.11 M. of diethyl chlorophosphonate of the formula

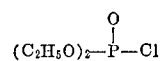

(prepared by reaction of ethanol with phosphorous oxychloride) is mixed with 0.1 m. of ethyl *cis*-propenylphosphonate in 150 ml. of ethanol. The mixture is stirred at room temperature for 5 hours and then brought to pH 9 with sodium hydroxide and heated at 80° C. for 6 hours. The solvent is removed *in vacuo* to afford sodium *cis*-propenylisohypophosphoric acid disodium salt.

The *cis*-propenylphosphonate esters of this invention (where Y and/or Z of Formula I are —OR and R is as previously defined) are hydrolyzed to the free acid as in Example 3, and converted to a salt prior to epoxidation to (±) (*cis*-1,2-epoxypropyl)phosphonates; alternatively, the propenyl esters may be epoxidized and the ester group then removed. The salts are epoxidized directly. Representative examples are the following, it being understood that other salts and esters are epoxidized in the same way:

*Cis*-propenylphosphonic acid (2.2 g., .018 mole) is dissolved in 10 ml. of water. The pH of the aqueous solution is adjusted to 5.5–6 by the addition of sodium bicarbonate (1.51 g., .017 mole) to produce sodium *cis*-propenylphosphonate. Sodium tungstate dihydrate (0.55 g., .0017 mole) is added, and the nearly neutral solution is placed in a water bath and heated to 55° C. The water bath is then removed, and 2 ml. of 30% hydrogen peroxide are added to the reaction mixture during 10 minutes. The reaction is exothermic, and the temperature rises to 65° C. during addition of the peroxide. An additional 1.6 ml. of hydrogen peroxide is added. Oxygen evolves from the solution during the addition, and the temperature remains at 55–57° C. without external heating. After standing 20 minutes, the temperature falls to 53° C. The reaction mixture is then heated in a water bath at 55° C. for an additional 20 minutes, filtered and the solution is freeze-dried to yield the mono-sodium salt of (±) (*cis*-1,2-epoxypropyl)phosphonic acid as a white powder, which is characterized by NMR spectra.

Peroxytrifluoroacetic acid is prepared by the method of Emmons (J. Am. Chem. Soc. 75 4623 (1953). A solution of 2.8 g. of peroxytrifluoroacetic acid in 20 ml. of chloroform is then added to 5 g. (0.022 moles) of benzylammonium *cis*-propenylphosphonate and 7 g. of solid disodium hydrogen phosphonate in 30 ml. of chloroform. The mixture is allowed to stand for 16 hours at 0° C. The solids are then separated by filtration. The solids are slurried in about 10 ml. of methanol; the slurry is filtered and the methanol filtrate evaporated to dryness *in vacuo* to give a solid residue of benzylammonium (±) (*cis*-1,2-epoxypropyl)phosphonate. The product is purified by recrystallization from 10 parts of 95% ethanol.

To a 100 ml. round-bottom 3-necked flask equipped with a stirrer, thermometer and an addition funnel is charged 6.4 g. (0.02 mole) dibenzyl *cis*-propenylphosphonate and 30 ml. of chloroform. A solution of monoperphthalic acid (3.6 g., 0.02 moles) in 20 ml. of ethyl acetate is added slowly and the mixture heated to 40° C. The course of the reaction is followed by gas liquid chromatography of the dibenzyl ester or by titration of the peracid. The reaction is essentially complete in 24 hours. At the end of this time, the mixture is cooled to room temperature, the phthalic acid removed by filtration and the dibenzyl ($\pm$) (cis-1,2-epoxypropyl)phosphonate recovered by removing the solvent in vacuo.

The cis-propenylphosphonamides, phosphonothioates and phosphonic halides (Formula I above, at least one of Y and Z represent —SR, —halo, $NR_1R_2$) are epoxidized to the ($\pm$) (cis-1,2-epoxypropyl) compounds in a similar fashion, representative examples being:

To a round-bottom 3-necked flask are charged 16.6 g. of propyl cis-propenylphosphonofluoridate and 30 g. of disodium hydrogen phosphate in 400 ml. of methylene dichloride. A solution of 14 g. of peroxytrifluoroacetic acid in 100 ml. of methylene dichloride is added and the temperature is held at 0° C. for 12 hours. The mixture is then filtered; the solids containing propyl ($\pm$) (cis-1,2-epoxypropyl)phosphonofluoridate are added to 100 ml. of methanol, brought to pH 4.5–5.5 with sodium hydroxide, and treated with 6.9 g. (0.1 M.) of hydroxylamine hydrochloride, and then stirred for 7 hours at room temperature. The mixture is again filtered, and concentrated to dryness in vacuo. 90 Ml. of a 1:2 methanol-acetone mixture is added, the mixture refluxed for 10 minutes, filtered, and the filtrate concentrated to dryness to afford mono-sodium monopropyl ($\pm$) (cis-1,2-epoxypropyl)phosphonate.

To 15.8 g. (0.1 M.) of cis-propenylphosphonic dichloride and 30 g. of disodium hydrogen phosphate in 400 ml. of chloroform there is added 15 g. of peroxytrifluoroacetic acid in 110 ml. of chloroform. The mixture is stirred at 0° C. for 11 hours and the solids recovered by filtration. The solids containing ($\pm$) (cis-1,2-epoxypropyl)phosphonic dichloride are added to 100 ml. of water, the pH is adjusted to 4.5–5.5 with sodium hydroxide, and the mixture stirred at room temperature for 6 hours. At the end of this time the solution is concentrated in vacuo to dryness. The residue is extracted with 3 × 30 ml. of methanol, and the methanol extracts combined and evaporated to dryness in vacuo to give sodium ($\pm$) (cis-1,2-epoxypropyl)phosphonate.

To a mixture of 2.1 g. (0.01 M.) of S,S-diethyl-cis-propenylphosphonodithioate, 50 ml. of n-propanol and 0.06 g. of sodium tungstate dihydrate at 55° C. there is added 3 ml. of 30% hydrogen peroxide, the peroxide addition being carried out slowly over a 20-minute period. The resulting mixture is stirred at 55° C. for 50 minutes and then quenched by addition of a saturated solution of sodium sulfite to a negative starch-iodide test. The mixture is concentrated to about ½ volume, 25 ml. of fresh n-propanol added and the mixture again concentrated to about ½ volume. 40 Ml. of methanol are added and the solids removed by filtration. The filtrate is concentrated to remove the solvent and to afford a residue of S,S-diethyl ($\pm$) (cis-1,2-epoxypropyl)phosphonodithioate.

To a mixture of 3.25 g. of N,N'-dibenzoyl cis-propenylphosphonodiamide in 15 ml. of methanol there is added 0.06 g. of sodium tungstate dihydrate and the mixture heated to 55° C. 3 Ml. of 30% hydrogen peroxide is then added slowly over 15 minutes, and the resulting mixture stirred for one hour at 55° C. The hydrogen peroxide is added during this time as necessary to maintain a positive starch-iodide test. At the end of the one hour, saturated aqueous sodium sulfite is added to decompose any remaining peroxie, the mixture filtered and evaporated to dryness under reduced pressure to afford N,N'-dibenzoyl ($\pm$) (cis-1,2-epoxypropyl)phosphondiamide. Inorganic salts are separated by extracting the phosphondiamide into methanol and removing the methanol.

To a 100 ml. round bottom 3-necked flask equipped with a stirrer, thermometer and an addition funnel is charged 6.4 g. (0.02 mole) of O,O-dibenzyl cis-propenylphosphonothioate and 30 ml. of methylene dichloride. A solution of monoperphthalic acid (3.6 g., 0.02 moles) in 20 ml. of ethyl acetate is added slowly and the mixture heated to 40° C. The course of the reaction is followed by gas liquid chromatography of the dibenzyl ester or by titration of the peracid. The reaction is essentially complete in 24 hours. At the end of this time, the mixture is cooled to room temperature, the phthalic acid removed by filtration and the O,O-dibenzyl ($\pm$) (cis-1,2-epoxypropyl)phosphonothioate recovered by removing the solvent in vacuo.

The ($\pm$) (cis-1,2-epoxypropyl)phosphonic acid compounds produced from the cis-propenylphosphonic acid compounds of the present invention are, if desired, converted to mono and/or di-salts of ($\pm$) (cis-1,2-epoxypropyl) phosphonic acid by the methods described hereinbelow, these salts having antibacterial activity.

(a) For alkenyl, alkynyl, aralkyl or aryl esters: A solution of 3.2 g. of dibenzyl (cis-1,2-epoxypropyl)phosphonate in 250 ml. of methanol is hydrogenated at 40 p.s.i. at room temperature for 15 minutes in the presence of 800 mg. of 10% palladium-on-charcoal catalyst and 2 g. of potassium bicarbonate.

The solution is then filtered from the catalyst and evaporated to dryness in vacuo at room temperature to give potassium cis-1,2-epoxypropylphosphonate.

(b) For aryl or lower alkyl esters: 4 g. of diphenyl ($\pm$) (cis-1,2-epoxypropyl)phosphonate in 100 ml. of an aqueous 2% solution of trimethylammonium carbonate is irradiated in a quartz flask at 25–30° C. for 4 hours with an ultraviolet light source. The solution is then evaporated to dryness and the residue extracted into anhydrous methanol. The solution is passed over a sulfonic acid resin column (IR 120 previously dehydrated with methanol) on the hydrogen cycle at 0–5° C. The effluent is collected and rapidly adjusted with cyclohexylamine to pH 5. Concentration of the solution to dryness affords ($\pm$) (cis-1,2-epoxypropyl)phosphonic acid monocyclohexylamine salt.

40 ml. of a medium consisting of 0.8% nutrient broth, 0.2% yeast extract, 3% cerelose and 0.3% malt extract, adjusted to pH 7.0, is autoclaved for 15 minutes in a 250 ml. Erlenmeyer flask at 121° C. and 15 p.s.i. The medium is then inoculated with a loopful of inoculum from an agar slant of Aspergillus niger, and the flask incubated on a mechanical shaker (220 r.p.m.) at 28° C. until the cultures are well grown (2–4 days). 10 ml. of the fermentation broth is then asceptically transferred to a centrifuge tube and the cells pelleted at 25,000 × g. The supernatant is discarded and the cells re-suspended in 4 ml. of distilled water 2 ml. of this cell suspension are aseptically transferred to a sterile 20 × 200 mm. test tube containing 2γ of sodium methyl ($\pm$) (cis-1,2-epoxypropyl)phosphonate in 2 ml. of water. The tube is incubated for 20 hours at 28° C. on a mechanical shaker (220 r.p.m.). The cells are then removed by centrifugation (25,000 × g). The supernatant is evaporated to dryness in vacuo to afford sodium ($\pm$) (cis-1,2-epoxypropyl)phosphonate.

(c) For substituted alkyl and aryl esters: 0.1 mole of bis-(acetoxymethyl) ($\pm$) (cis-1,2-epoxypropyl)phosphonate is dissolved in 50 ml. of water and then 0.1 mole of calcium oxide is added. The solution is heated with stirring at 20–30° C. for 2 hours. It is then concentrated to dryness in vacuo to give a residue of calcium ($\pm$) (cis-1,2-epoxypropyl)phosphonate.

(d) For aryl esters: 5 g. of diphenyl ($\pm$) (cis-1,2-epoxypropyl)phosphonate in 5 ml. of methanol is added to 100 ml. of trimethylamine. Small pieces of sodium are added gradually to a total of 2.0 gm. The solvents are removed by concentration, and the product is extracted into methanol. The methanol solution is then passed over a column of IR 120 resin on the hydrogen cycle which has been precooled to 5° C. The effluent is basified to pH 8.2 with phenethylamine and concentrated to give (±) (cis-1,2-epoxypropyl)phosphonic acid as the bis-phenethylamine salt.

The (±) (cis - 1,2 - epoxypropyl)phosphonamidates, phosphonthioates and phosphonic halides are converted to the antibacterially active salts of (±) (cis-1,2-epoxypropyl)phosphonic acid by the methods described below:

The compounds of Formula I above where one or both of Y and Z are halo, and particularly chloro or bromo, are readily converted to the corresponding phosphonate by heating in an aqueous medium at temperatures of from about room temperature to 50° C. Best results are obtained by heating in aqueous alkali metal hydroxide, e.g. sodium or potassium hydroxide, at a pH of about 4.5–7.5 at 40–50° C. for 3–5 hours. The resulting alkali metal phosphonate salt may be recovered by known methods. When Y and/or Z in Formula I are fluoro, the fluoride is replaced by treating the phosphonic fluoride with hydroxylamine in aqueous medium, preferably at a pH of about 5.0–8.0.

When X in Formula I above represents sulfur (i.e. phosphonothioates), the sulfur is replaced by oxygen by treating the sulfur-containing compound with peroxytrifluoroacetic acid, or with bromine water, as for example: To 0.1 m. of O,O-dibenzyl (±) (cis-1,2-epoxypropyl)phosphonothioate and 30 g. of disodium hydrogen phosphate in 400 ml. of chloroform there is added 15 g. of peroxytrifluoroacetic acid in 100 ml. of chloroform. The mixture is stirred at 0–15° C. for 10 hours. The reaction mixture is then filtered and the filtrate concentrated to dryness in vacuo to afford O,O-dibenzyl (±) (cis-1,2-epoxypropyl)phosphonate.

When Y and/or Z in Formula I above are —SR, these phosphonothioates and phosphonodithioates are converted to phosphonates by treatment with silver nitrate:

0.1 mole of S,S'-diethyl (±) (cis-1,2-epoxypropyl)phosphonodithioate in 100 ml. of water is added to 0.2 mole of silver nitrate in 200 ml. of water. The mixture is stirred and after 20 minutes 10 g. of sodium chloride and 50 ml. of water is added. The mixture is filtered and the precipitate washed with water. The combined filtrate and washings are concentrated to dryness in vacuo to afford disodium (±) (cis-1,2-epoxypropyl)phosphonate. Alternatively, the combined filtrate and washes are passed over Dowex 50 cation exchange resin on the hydrogen cycle, and the column effluent containing (±) (cis-1,2-epoxypropyl)phosphonic acid neutralized with a molar equivalent of benzylamine to give benzylammonium (±) (cis-1,2-epoxypropyl)phosphonate.

When Y and/or Z in Formula I represent —NR$_1$R$_2$, these phosphonamides and phosphonodiamides are converted to (±) (cis-1,2-epoxypropyl)phosphonates by basic hydrolysis:

0.1 m. of N,N,N',N'-tetraethyl (±) (cis-1,2-epoxypropyl)phosphonodiamide in 100 ml. of water is brought to pH 8.2 with 0.1 N sodium hydroxide, and the mixture stirred at 50° C. for one hour. It is then cooled to 10° C. and 0.1 m. of calcium acetate monohydrate added with stirring. The mixture is stirred for one hour at 10–15° C., and the precipitated calcium (±) (cis-1,2-epoxypropyl) phosponate recovered by filtration.

If desired, the (±) (cis-1,2-epoxypropyl)phosphonic acid salts thus obtained are resolved into the optical enantiomers thereof by formation of a salt with an optically active amine, separation of the resulting diastereomers, and regeneration of the enantiomeric salts:

A solution of 49.1 g. of the monobenzylammonium salt of racemic (cis-1,2-epoxypropyl)phosphonic acid in 490 ml. of water is cooled to 0–5° C. and passed through a column containing 330 ml. of a sulfonic acid cation exchange resin of the polystyrene type (Dowex 50) on the acidic cycle, which had been previously cooled to 0–2° C. The phosphonic acid salt is passed over the resin at a rate of 20–40 ml. per minute. The column is then washed with 660 ml. of 0–5° C. water at the same rate. The combined effluents are collected in an agitated mixture of 24.2 g. of (+)-α-phenethylamine in 100 ml. of water. The pH on the resulting solution is then adjusted to 4.8 by the dropwise addition of an aqueous solution of (+)-α-phenethylamine. The resulting solution is evaporated in vacuo to 95–100 ml. and sufficient isopropanol (about 320 ml.), preheated to 70° C., is added so that the resulting solution contains about 20% water. The resulting solution is heated with agitation to 75–79° C. and then quickly cooled to 60° C. and seeded with a small amount of mono-(+)-phenethylammonium (—) (cis-1,2-epoxypropyl)phosphonate. This solution is then cooled to 0–3° C. and stirred slowly for 16–24 hours, whereupon the crystalline diastereomer precipitates and is collected by filtration. The filter cake is washed with 40 ml. of cold isopropanol-water (9:1) and finally with 40 ml. of cold isopropanol. The crystalline product is then dried at 40° C. to constant weight in vacuo. The mono-(+)-phenethylammonium (—) (cis-1,2 - epoxypropyl)phosphonate so obtained melts at 129–132° C. when the sample is inserted at 125° C. and heated at 2° C. per minute. The product has a rotation $$[\alpha]^{28° C.}_{405 m\mu}:$$

(C.=5%, H$_2$O)=2.6°. Recrystallization from aqueous isopropanol affords crystalline product melting at 133–136° C. and having the same rotation.

1 gram of N,N,N',N'-tetramethylpropynylphosphondiamide is dissolved in 10 ml. of methanol and hydrogenated at atmospheric pressure in the presence of 250 mg. of 5% palladium on calcium carbonate. After the theoretical uptake of hydrogen is observed, the reaction mixture is filtered and the filtrate concentrated to dryness in vacuo to obtain N,N,N',N'-tetramethyl cis-propenylphosphondiamide as an oily residue. The infrared spectrum of the product shows the presence of the 6.12μ bond, characteristic of the cis olefin.

The N,N,N',N' - tetramethylpropynylphosphondiamide used as starting material in the above process is obtained by adding a solution of 0.1 m. of methylacetylene magnesium bromide in 500 ml. of benzene and 100 ml. of tetrahydrofuran slowly with stirring to a solution of 0.1 m. of N,N,N',N' - tetramethylchlorophosphondiamide in 200 ml. of benzene. The addition is carried out over a three hour period, holding the temperature below 28° C. The resulting clear solution is allowed to stand at room temperature for 15 hours. 200 Ml. of aqueous ammonium chloride is then added, the water layer separated and washed twice with benzene. The combined benzene solutions are dried over anhydrous sodium sulfate and evaporated to dryness in vacuo to give N,N,N',N'-tetramethylpropynylphosphondiamide.

When the foregoing procedure is repeated using N,N-diethylpropynylphosphonamidate (obtained from N,N-diethylphosphonamidodichloridate and methylacetylene magnesium bromide) there is obtained N,N-diethyl cis-propenylphosphonamidate.

What is claimed is:

1. An amine salt of cis-propenylphosphonic acid wherein the amine is selected from the group consisting of α-phenethylamine, diethylamine, diethylene diamine, quinine, brucine, lysine, arginine, procaine, ethanolamine, morphine, benzylamine, ethylenediamine, N,N' - dibenzylethylenediamine, diethanolamine, piperazine, N-aminoethylpiperazine, dimethylaminoethanol, 2-amino-2-methyl-1-propanol, theophylline, and N-methylglucamine.

2. Benzylammonium cis-propenylphosphonate.

3. α-Phenethylammonium cis-propenylphosphonate.

References Cited

Nazarov et al.: Chem. Abstracts, vol. 52, col. 19925 (1958).

OTHER REFERENCES

Elsner et al.: J. Chem. Soc. (1953), pp. 3156–3160.
Crombie: J. Chem. Soc. (1955), pp. 1007–1025.
Oroshnik et al.: J. Am. Chem. Soc., vol. 74, pp. 295–304 (1952).
Spanswick et al.: Chemical Abstracts, vol. 72, p. 282 (1970).

LEON ZITVER, Primary Examiner

M. W. GLYNN, Assistant Examiner

U.S. Cl. X.R.

260—253, 260 R, 268 K, 284, 285, 286 R, 348 R, 936, 937, 950 954, 956, 472, 501.12, 501.19, 501.2, 502.4 R

UNITED STATES PATENT OFFICE
CERTIFICATE OF CORRECTION

Patent No. 3,849,482    Dated November 19, 1974

Inventor(s) Burton G. Christensen, et al.

It is certified that error appears in the above-identified patent and that said Letters Patent are hereby corrected as shown below:

In Column 16, Claim 1, line 64, change

"diethylene diamine" to read --diethylene triamine--.

Signed and sealed this 4th day of February 1975.

(SEAL)
Attest:

McCOY M. GIBSON JR.
Attesting Officer

C. MARSHALL DANN
Commissioner of Patents